(12) United States Patent
Kubodera et al.

(10) Patent No.: US 6,910,473 B1
(45) Date of Patent: Jun. 28, 2005

(54) METHOD OF CUTTING CERAMIC GREEN BLOCK

(75) Inventors: Noriyuki Kubodera, Kyoto (JP); Yasuto Inagaki, Kyoto (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 09/348,713

(22) Filed: Jun. 30, 1999

Related U.S. Application Data

(62) Division of application No. 08/625,008, filed on Mar. 29, 1996, and a continuation of application No. 08/237,235, filed on May 2, 1994, now abandoned, which is a continuation of application No. 07/901,741, filed on Jun. 22, 1992, now abandoned.

(30) Foreign Application Priority Data

Jun. 26, 1991 (JP) .............................................. 3-153626

(51) Int. Cl.$^7$ ................................................. B28D 1/02
(52) U.S. Cl. .......................................... 125/12; 451/53
(58) Field of Search ....................... 451/53, 41; 264/67, 264/63, 66; 125/13.01, 12

(56) References Cited

FOREIGN PATENT DOCUMENTS

JP           212894       *    1/1990

* cited by examiner

*Primary Examiner*—Robert A. Rose
(74) *Attorney, Agent, or Firm*—Ostrolenk, Faber, Gerb & Soffen, LLP

(57) ABSTRACT

In order to enable cutting of a soft ceramic green block by a dicing saw having excellent cutting accuracy, heat treatment is performed on the ceramic green block to dissociate a plasticizer, thereby improving hardness of the ceramic green block. Then the ceramic green block is cut by the dicing saw.

21 Claims, No Drawings

METHOD OF CUTTING CERAMIC GREEN BLOCK

This application is a Div of Ser. No. 08/625,008 Mar. 29, 1996 and a con of Ser. No. 08/237,235 May 02, 1994 ABN which is a con of Ser. No. 07/901,741 Jun. 22, 1992 ABN.

BACKGROUND OF THE INVENTION

1. Field of the Invention

The present invention relates to a method of cutting a ceramic green block.

2. Description of the Background Art

In order to cut out chips from a fired ceramic block or cut an Si wafer, generally employed is a dicing saw, which has high dimensional accuracy in cutting. However, the dicing saw, which is adapted to cut a workpiece with a high-speed rotary knife in general, is not suitable for cutting a soft or adhesive material.

On the other hand, a ceramic green block is generally pushingly cut by a blade. Such a ceramic green block is soft enough to allow a blade to cut pushingly the block at a higher cutting speed as compared with the dicing saw, with equipment of a lower cost. Thus, the cutting operation can be carried out at a reasonable cost.

Chips thus cut out from a ceramic green block are employed as elements for obtaining ceramic electronic components, for example.

As electronic components have been increasingly miniaturized and improved in performance in recent years, chips must be cut out from a ceramic green block in higher cutting accuracy.

When a blade is employed for pushingly cut out such chips, however, it is difficult to attain high cutting accuracy due to movement of the block or the chips during cutting, as understood from the cutting principle thereof. Further, it is difficult to pushingly cut a ceramic green block which has a hard internal portion of a metal film or a metal foil by such a blade.

On the other hand, a dicing saw is satisfactory in cutting accuracy. When such a dicing saw is adapted to cut a soft workpiece such as a ceramic green block, however, the cost for the cutting step is increased since such a soft material cannot be cut at a high speed.

SUMMARY OF THE INVENTION

Accordingly, an object of the present invention is to provide a method which can efficiently cut a ceramic green block with application of a dicing saw.

In order to solve the aforementioned technical problem, the present invention is characterized in that the ceramic green block is heat treated to be improved in hardness, before the same is cut by a dicing saw.

In the ceramic green block to which the present invention is applied, at least a portion to be cut may not necessarily be formed only by a ceramic green body, but may contain a different material in the form of a metal paste film or a metal foil.

According to the present invention, the ceramic green sheet is heat treated to be improved in hardness.

Therefore, the ceramic green block can be cut by a dicing saw at a high speed.

Since the ceramic green sheet is cut by a dicing saw, it is possible to improve cutting accuracy as well as to obtain a smooth cut surface.

According to the present invention, therefore, chips for electronic components can be cut out in high accuracy, whereby it is possible to cope with miniaturization and improvement in performance of such electronic component chips.

In the present invention, the ceramic green block preferably contains 4 to 20 percent by weight of a binder. If the content of the binder is less than 4 percent by weight, it is impossible to bind the block when a solvent is vaporized by the heat treatment. When the content of the binder exceeds 20 percent by weight, on the other hand, the block is undesirably softened in the process of heat treatment.

In the present invention, further, Vickers hardness of the ceramic green block is preferably brought into a range of 20 to 100 kg/cm$^2$ by the heat treatment. Such a preferable range of Vickers hardness has been experimentally found out, in order to attain an excellent cutting property for cutting a ceramic green block by a dicing saw.

In the heat treatment step according to the present invention, the heat treatment temperature is preferably selected in a range of 50 to 200° C. If the heat treatment temperature is less than 50° C., no effect of heating appears on the ceramic green block, while the binder is undesirably converted if the heat treatment temperature exceeds 200° C.

The foregoing and other objects, features, aspects and advantages of the present invention will become more apparent from the following detailed description of the present invention.

DESCRIPTION OF THE PREFERRED EMBODIMENTS

Experimental Examples of the present invention are now described.

A ceramic raw material was prepared by mixing the following materials in the following compounding ratios:

| | |
|---|---|
| calcined solid solution of BaTiO$_3$ | 100 parts by weight |
| binder (polyvinyl butyral) | 10 parts by weight |
| plasticizer (dioctyl phthalate) | 4 parts by weight |
| toluene | 50 parts by weight |
| ethanol | 50 parts by weight |

The as-obtained slurry was formed into sheets of 20 μm in thickness, 100 mm in width and 100 m in length, to prepare three ceramic green blocks with a pressurizer in the following manners:

A. 50 sheets were brought into pressure contact with each other to prepare a ceramic green block of 50 mm by 50 mm by 1 mm.

B. Ni paste was applied to single surfaces of sheets in thickness of 3 μm, and these sheets were brought into pressure contact with each other to prepare a ceramic green block of 50 mm by 50 mm by 1 mm.

C. Sheets and Ni foils of 3 μm in thickness were alternately brought into pressure contact with each other to prepare a ceramic green block of 50 mm by 50 mm by 1 mm.

These blocks A to C were cut by a dicing saw at a feed rate of 50 mm/sec., with no curing. Surface roughness values Ra of the as-formed cut surfaces are as follows:

A. Ra=0.20 to 0.30 μm
B. Ra=0.25 to 0.35 μm
C. Ra=0.50 to 1.00 μm

On the other hand, the same blocks A to C were cured and then cut by a dicing saw at the same feed rate as the above.

In more concrete terms, heat treatment was performed at 150° C. for 5 hours to cure the blocks A to C while dissociating plasticizers, and thereafter these blocks A to C were cut respectively. Surface roughness values Ra of the as-formed cut surfaces are as follows:

A. Ra=0.05 to 0.08 μm
B. Ra=0.05 to 0.08 μm
C. Ra=0.10 to 0.15 μm

In order to attain surface roughness values which were equivalent to those of the cut surfaces of the cured blocks, it was necessary to reduce the feed rate of the dicing saw to 2 mm/sec. Thus, it is understood from these Experimental Examples that the cutting time of the dicing saw can be reduced to 1/25 when the ceramic green block is cured by heat treatment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of accurately cutting miniaturized ceramic electronic component chips from a ceramic block, comprising the steps of:

preparing a ceramic green block by pressure laminating a plurality of ceramic green sheets and applying a metal foil to a surface of at least one of said plurality of ceramic green sheets so as to form a hard inner metal electrode portion in said ceramic green block; said ceramic green block including a binder, in an amount of at least 4 percent by weight of the block;

heat treating said ceramic green block at 50 degrees C. or higher so as to cure it and improve its hardness, thereby giving said heat treated ceramic block a Vickers hardness in the range of 20 to 100 kg/cm$^2$; and cutting ceramic electronic component chips from said heat treated ceramic block with a dicing saw at high speed to obtain smooth cut surfaces.

2. The method in accordance with claim 1, wherein the prepared ceramic green block contains the binder in an amount 4 to 20 percent by weight.

3. The method in accordance with claim 1, wherein a heat treatment temperature of 50 to 200° C. is applied during said step of heat treating.

4. The method in accordance with claim 1, wherein said step of preparing the ceramic green block further comprises the steps of preparing a slurry of ceramic raw material, forming the slurry into a plurality of sheets and pressing the sheets together.

5. The method in accordance with claim 1, wherein said step of applying a metal foil comprises the step of placing a layer of Ni foil between at least some of the sheets prior to pressing the sheets together.

6. The method in accordance with claim 1, wherein surface roughness values Ra of said cut ceramic block of substantially 0.05–0.15 μm are provided in said cutting step.

7. The method in accordance with claim 6, wherein said surface roughness value Ra is in the range of substantially 0.05–0.08 μm.

8. The method in accordance with claim 1, wherein said blocks are cut with a dicing saw at a feed rate of greater than 2 mm/sec.

9. The method in accordance with claim 8, wherein said feed rate is 50 mm/sec.

10. The method in accordance with claim 1, wherein said ceramic green block comprises barium titanate.

11. The method in accordance with claim 1, wherein the prepared ceramic green block contains the binder in the amount of 4–20% by weight and a heat treatment temperature of 50–200° C. is applied during the heat treatment step.

12. The method in accordance with claim 6, wherein said surface roughness value Ra is in the range of substantially 0.10–0.15 μm.

13. The method in accordance with claim 12, wherein said step of preparing said ceramic green block further comprises the steps of preparing a ceramic slurry, forming the slurry into a plurality of sheets, placing layers of Ni foil between at least some of the sheets, and pressing the sheets together.

14. A method of accurately cutting miniaturized ceramic electronic component chips from a ceramic block, comprising the steps of:

preparing a ceramic green block by pressure laminating a plurality of ceramic green sheets and applying a metal foil to a surface of at least one of said plurality of ceramic green sheets so as to form a hard inner metal portion in said ceramic green block; said ceramic green block including a binder, in an amount of at least 4 percent by weight.

heat treating said ceramic green block at 50 degrees C. or higher so as to cure it and improve its hardness; and cutting said heat treated ceramic block into ceramic electronic component chips with a dicing saw and thereby obtaining surface roughness values Ra of the cut ceramic block within the range of substantially 0.05–0.15 microns.

15. The method in accordance with claim 14, wherein the heat treated ceramic block has a Vickers hardness of 20 to 100 kg/cm$^2$.

16. The method in accordance with claim 14, wherein the prepared ceramic green block contains a binder in the amount of 4–20% by weight and a heat treatment temperature of 50–200° C. is applied during the heat treating step.

17. The method in accordance with claim 14, wherein said blocks are cut with a dicing saw at a feed rate of greater than 2 mm/sec.

18. The method in accordance with claim 17, wherein said feed rate is 50 mm/sec.

19. A method in accordance with claim 14, wherein said ceramic green block comprises barium titanate.

20. The method in accordance with claim 14, wherein said step of preparing the ceramic green block further comprises the steps of preparing a slurry of ceramic raw material, forming the slurry into a plurality of sheets and pressing the sheets together.

21. The method in accordance with claim 20, wherein said step of preparing said ceramic green block further comprises the step of placing layers of Ni foil between at least some of the sets prior to pressing the sheets together.

* * * * *